(12) United States Patent
Candelore et al.

(10) Patent No.: US 10,264,330 B1
(45) Date of Patent: Apr. 16, 2019

(54) SCENE-BY-SCENE PLOT CONTEXT FOR COGNITIVELY IMPAIRED

(71) Applicant: Sony Corporation, Tokyo (JP)

(72) Inventors: Brant Candelore, Escondido, CA (US); Mahyar Nejat, La Jolla, CA (US); Peter Shintani, San Diego, CA (US); Robert Noel Blanchard, Escondido, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/861,445

(22) Filed: Jan. 3, 2018

(51) Int. Cl.
H04N 7/10 (2006.01)
H04N 21/84 (2011.01)
G06K 9/00 (2006.01)
H04N 21/278 (2011.01)
H04N 21/266 (2011.01)

(52) U.S. Cl.
CPC ......... H04N 21/84 (2013.01); G06K 9/00718 (2013.01); G06K 9/00751 (2013.01); H04N 21/26603 (2013.01); H04N 21/278 (2013.01)

(58) Field of Classification Search
CPC ............. H04N 21/84; H04N 21/26603; H04N 21/278; G06K 9/00718; G06K 9/00751
See application file for complete search history.

(56) References Cited

U.S. PATENT DOCUMENTS

| 6,219,837 | B1 | 4/2001 | Yeo et al. |
| 7,020,889 | B1 | 3/2006 | Hütter et al. |
| 8,321,203 | B2 | 11/2012 | Seo |
| 9,438,947 | B2 | 9/2016 | Schneiderman et al. |
| 9,578,392 | B2 | 2/2017 | Abecassis et al. |
| 2003/0115607 | A1 | 6/2003 | Morioka et al. |
| 2005/0097621 | A1 | 5/2005 | Wallace et al. |
| 2005/0228806 | A1 | 10/2005 | Haberman |
| 2005/0278734 | A1 | 12/2005 | Franklin et al. |
| 2005/0283804 | A1 | 12/2005 | Sakata et al. |
| 2009/0102848 | A1 | 4/2009 | Park et al. |
| 2009/0119704 | A1 | 5/2009 | Dimitrova et al. |
| 2013/0111525 | A1 | 5/2013 | Choi et al. |
| 2013/0343721 | A1 | 12/2013 | Abecassis |
| 2014/0177964 | A1 | 6/2014 | Godlewski et al. |
| 2015/0007217 | A1* | 1/2015 | Wood ............... H04N 21/23418 725/32 |

(Continued)

FOREIGN PATENT DOCUMENTS

| JP | 2001044948 A | 2/2001 |
| JP | 2001292424 A | 10/2001 |
| JP | 2010258908 A | 11/2010 |

OTHER PUBLICATIONS

Brant Candelore, "Scene-By-Scene Plot Context for Cognitively Impaired", file history of related U.S. Appl. No. 15/861,445, filed Aug. 16, 2014.

Primary Examiner — John R Schnurr
(74) Attorney, Agent, or Firm — John L. Rogitz

(57) ABSTRACT

To improve cognitive comprehension of plots in videos and thus assist not only people with cognitive issues but also inattentive people that have trouble following along with the plot, information is sent about each scene in a video. Image recognition or speech recognition may be implemented on a video to recognize where in the video the viewer currently is at, and ancillary information pertaining to that spot in the video presented immediately or at a convenient scene break.

19 Claims, 7 Drawing Sheets

(56) References Cited

U.S. PATENT DOCUMENTS

| | | |
|---|---|---|
| 2015/0179228 A1* | 6/2015 | Oisel .............. H04N 21/23418 |
| | | 386/241 |
| 2015/0245101 A1 | 8/2015 | Stathacopoulos |
| 2016/0050467 A1* | 2/2016 | Candelore .......... H04N 21/4882 |
| | | 725/32 |
| 2017/0169853 A1* | 6/2017 | Hu ..................... H04N 21/233 |
| 2018/0152767 A1* | 5/2018 | Liu ................. H04N 21/21805 |

\* cited by examiner

"Info" toggled twice, e.g.

"Info" toggled 3 times, e.g.

SCENE-BY-SCENE PLOT CONTEXT FOR COGNITIVELY IMPAIRED

FIELD

The application relates generally to scene-by-scene plot contexts for the cognitively impaired.

BACKGROUND

TV series and movies and other types of entertainment video often have complicated plots with many characters and storyline twists. As understood herein, it can be hard to follow a plot without a lot of confusion on the part of the viewer, particularly a cognitively impaired viewer. Very complicated plot twists may occur with many different characters, making it difficult to understand what is happening on screen. There can even be parallel plot threads in shows or movies that do not meet up until late in the story line or at the very end. Some TV series introduce characters in one episode, and then they don't show up again until many episodes later. Further, it may be difficult for the viewer to remember who the characters are and what the relationship is to the main characters and what the relevance is of their presence in a particular scene.

SUMMARY OF THE INVENTION

As understood herein, an overall description of an episode or movie such as may be provided responsive to pressing an "info" key on a remote control does not provide sufficient detail to enable a viewer to understand all the various aspects of a show or movie, and moreover can "spoil" the ending of the video.

Accordingly, an audio video device (AVD) such as a TV can receive video programming via high definition multimedia interface (HDMI) or decoding it by itself through a network streaming application executed by on the TV. An image of one or more video frames on the display of the TV is captured, in some implementations by a different application executed by the TV or by the same streaming application that decodes the content. The images of the one or more frames are sent to an online service which performs image recognition of the elements of the scene to include the location of the scene, the position of the particular scene with respect to the entire show or movie, the identity of the individuals in the scene, the plot that has evolved to the present (without revealing the ending). This information is rendered back on the TV.

The user might wish to identify the particular show or movie to the service. However, the service might recognize the scene on its own and deliver information back to the TV. Or as described above, the application that is streaming the content may also capture the screen images and therefore knows the content and where in the content it is playing from. Alternatively, a smartphone can take a picture of the scene on the TV screen and send that to a server on the Internet. The smartphone then receives back the information, not the TV.

This service can also link in to a forum of fans to see what they are thinking without revealing information about upcoming shows or scenes in a movie that might spoil the surprise in an ending.

Accordingly, a computer program product includes a computer memory that is not a transitory signal and that in turn includes instructions executable by a processor for, for a first scene in plural scenes of a piece of content, capturing at least a portion of at one frame in the content. The instructions are executable for providing a portion of the frame to an image recognition device that recognizes video elements including non-textual elements in the frame. The instructions are further executable for receiving from the image recognition device first plot information relating to the first scene. The first plot information does not relate to scenes occurring in the content after the first scene occurs. The instructions are executable for presenting the first plot information.

In examples, the instructions are executable for capturing the at least one frame in response to one or more commands received form a remote control (RC). If desired, the instructions when executed by the processor may configure the processor for playing the content using a first computer application, and capturing the at least one frame using a second computer application different than the first computer application. Or, the instructions when executed by the processor may configure the processor for playing the content using a first computer application and capturing the at least one frame using the first computer application.

In non-limiting embodiments, the first plot information includes at least one non-textual symbol.

In some implementations, the instructions when executed by the processor may configure the processor for presenting the first plot information at a predetermined location in the content occurring after the frame is captured, with the content being paused at the predetermined location and with the first plot information that is presented while the content is paused at the predetermined location including a video clip that is not part of the content.

In some examples described below, the instructions may be executable for receiving a first command from a remote control (RC), and responsive to the first command, presenting at least one code on the display. The code is captured and provided to the image recognition device. The instructions are executable for receiving from the image recognition device the first plot information relating to the first scene.

In some examples described below, the instructions may be executable for presenting on the display at least one user interface (UI) with a first selector selectable to cause presentation of plot information relating to the content from the start of the content to a current location of the content, but not beyond the current location. The UI may include a second selector selectable to cause presentation of plot information relating to the content from the start of the first scene, but not before, to a current location of the content, but not beyond the current location. Yet again, the UI can include a third selector selectable to cause presentation of plot information relating to the content in its entirety from beginning to end of the content.

In another aspect, a server includes at least one non-transitory computer readable storage medium with instructions executable by a processor to configure the processor for receiving, from an apparatus, at least one image from content played on the AVD. The apparatus may be the AVD or another device such as a mobile communication device (MCD), of which a "smart phone" is an example. The instructions are executable for executing image recognition on at least one non-textual portion of the image to render a result, and correlating the result to plot information relating to a first part of the content but not relating to a second part of the content occurring in the content after the first part. The instructions are executable for returning the plot information to the apparatus.

The non-textual portion may include an image of a video object. Or, the non-textual portion can include a computer code. The plot information can include a video clip.

In another aspect, a method, includes, at an audio video device (AVD), receiving a command from a control device. The method also includes, responsive to the command, providing at least one non-textual portion of at least one frame of content presented on the AVD to an image recognition device. The method includes receiving from the image recognition device plot information pertaining to the content up to reception of the command but not after, and presenting the plot information on the AVD.

The details of the present invention, both as to its structure and operation, can be best understood in reference to the accompanying drawings, in which like reference numerals refer to like parts, and in which:

DETAILED DESCRIPTION

Figure 1:
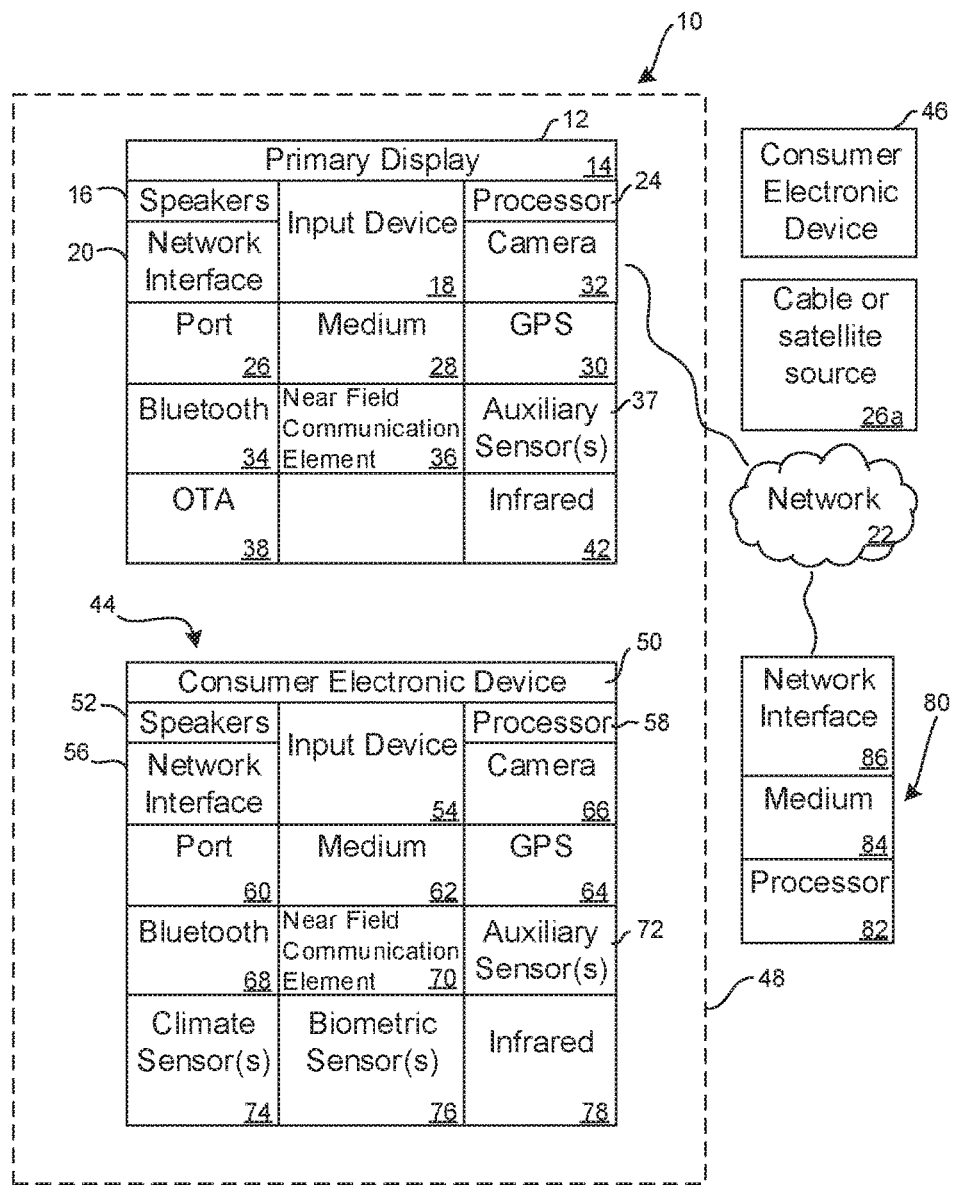
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B. and C" (likewise "a system having at least one of A, B, or C" and "a system having at least one of A, B, C") includes systems that have A alone. B alone, C alone, A and B together, A and C together, B and C together, and/or A. B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVD 12 may further include one or more tangible computer readable storage medium 28 such as disk-based or solid state storage, in some cases embodied in the chassis of the AVD as standalone devices or as a personal video recording device (PVR) or video disk player either internal or external to the chassis of the AVD for playing back AV programs. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTH TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
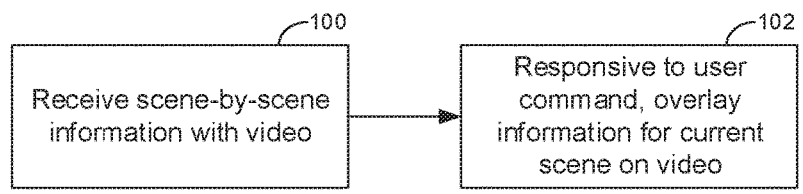
FIG. 2 is a flow chart of example logic according to present principles.

Now referring to FIG. 2, at block 100 a device such as the AVD 12 receives receiving content with plural scenes. Along with one or more scenes of the content, data is delivered to the AVD 12 which can be presented on the display 14 in alpha-numeric form at block 102, responsive to user command to do so if desired, that represents plot information relating to the scene. The plot information data can be delivered along with the content and can be keyed into the content stream to accompany the content which it describes, e.g., in the vertical blanking interval (VBI) of a broadcast stream, in packet headers of packetized video data, etc. In this way, for each different scene of content, if desired, plot information related to that respective scene can be presented on the display.

The user command to overlay the plot information onto the video may be a double toggle of an "info" key on the second CE device 46 implemented as a remote control (RC) of the AVD 12, for example. A double toggle may be established by two manipulations of the info key within a predetermined period. A single toggle of the "info" button may cause to be presented an overall description of the entire program, whereas FIG. 3 shows that responsive to a double toggle command, an example screen shot 104 of the display 14 may be presented in which video 106 fills substantially the entire display screen and plot information 108 specific to the scene being shown, as opposed to the entire program, is presented.

The plot information 108 may thus summarize events that have occurred in the program only thus far (i.e., up to the current scene) but will not "spoil" the program by mentioning events that occur in later scenes. Thus, the plot information 108 is not simply a generalized summary of the entire program but rather a specific clue pertaining to the scene being shown to help a viewer better follow what is unfolding in the program. Also unlike a generalized summary of the entire program, which remains static throughout the program, the plot information 108 changes from one scene to the next during the program.

Figure 3:
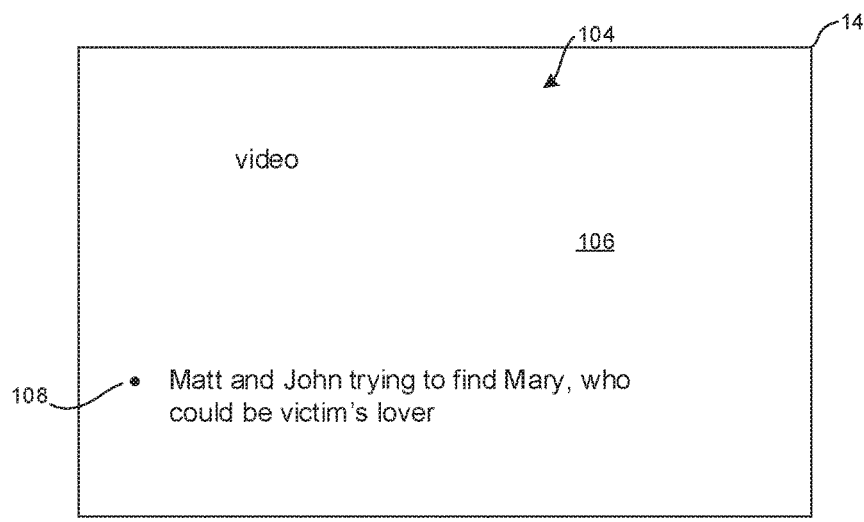
FIGS. 3 and 4 are screen shots of example user interfaces (UIs) according to present principles.
Figure 4:
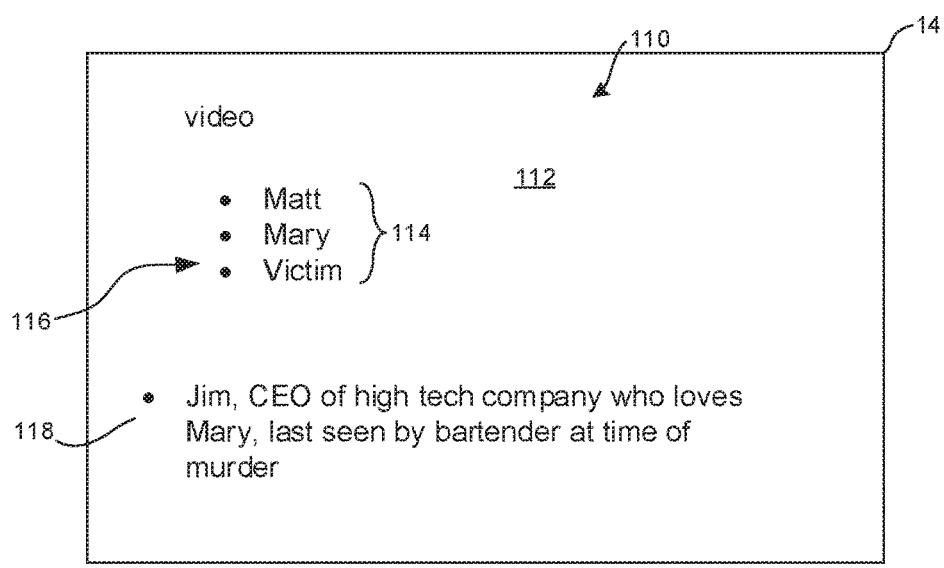

Additional, detailed scene information may also be provided in addition to the overall scene information shown in FIG. 3. FIG. 4 illustrates. Such additional detailed scene information may be presented in response to a user command generated by, e.g., three manipulations of the "info" key on the RC within a predetermined period.

As shown in FIG. 4, responsive to the more detailed information command however established, a screen shot 110 of the display 14 shows that the scene video 112 is presented substantially full screen with a list 114 of characters overlaid thereon. The characters in the list may be characters appearing only in the current scene, so that other characters in the program are not shown in the current scene list 114. A viewer can manipulate the RC to move a selector 116 on the list and select a desired one of the characters, in response to which still further detailed information may be presented describing the selected character. Scene information 118 appears below the list 114.

Accordingly, present principles are related to accessibility and cognitive comprehension of plots and stories, recognizing that it can be helpful not only to people with cognitive issues but also "normal" people that have trouble following along with the plot. As with closed captioning data, scene information is sent about each scene. In the examples shown herein, detectives Matt and John are trying to find the whereabouts of Mary in order to question her about a murder. Mary was mentioned by the bartender when interviewed by Matt and John. The bartender said that Mary was present when the killing took place . . . and had been talking to the killer right before the shooting. In the scene represented in FIG. 3, Matt and John are knocking on the door of Mary's residence. But she does not appear to be home.

Then, in the scene represented in FIG. 4, the scene information indicates that the victim is Jim Stuart, CEO of a small high tech company who appeared to be having an affair with Mary.

In any case, scene information does not divulge future action in future scenes so as not to spoil the show, but instead allows viewers to re-engage or stay engaged with the show, program or movie.

In one example, the scene information may be delivered using so-called "608/708" descriptive data that is inserted into the stream of each scene. For IP streams, timed text tracks may be used to deliver timed data that can be displayed as needed by the viewer.

FIGS. 5-10 illustrate additional principles related to the above which may be employed by any of the devices/systems described herein. Commencing at block 500 in FIG. 5, a screen shot of images in one or more video frames being presented on, e.g., the display 14 of the AVD 12 is captured. This may be done in response to, for example, a viewer of the AVD manipulating a predetermined key on the RC 44 such as a "pause" key or "info" key to send a command, typically wirelessly, to the AVD.

The AVD 12 may present video images received from a high definition multimedia interface (HDMI) source of content, or it may present video images obtained from a computer network using a video application. The screen capture may be done by a different application executed by the AVD than the video application, or by the same streaming video application that decodes the content.

The images of the one or more frames are sent at block 502 to a recognition computer. The recognition computer can be implemented by any processor described herein and in an example embodiment is implemented by a network server. At block 504 the recognition computer executes image recognition of the elements of the captured screen shot(s). Image recognition may be implemented using, e.g., face recognition algorithms on images of people in the screen shot, image recognition algorithms implemented on non-person objects in the screen shot, etc. In general, while text may be recognized in the screen shots the image recognition is implemented on non-textual image elements, including symbols such as quick response (QR) codes as described below in one of the embodiments herein.

Moving to block 506, using the results of the image recognition, the logic enters a database of images to correlate the results to one or more entries in the database. The entries in the database in turn are correlated to information pertaining to the screen shot such the location within the overall video of the scene from whence the screen shot was obtained, the geographic location depicted by the screen shot, the identities of individuals in the scene, and information pertaining to the plot of the video that has evolved in the video up until the approximate place in the video the screen shot was obtained. This information may be in several sets. One plot information set may include a synopsis of the entire video up to the beginning of the scene from whence the screen shot was obtained, but not beyond. A second plot information set may include a synopsis of the entire video up to the end of the scene from whence the screen shot was obtained, but not beyond. A third plot information set may include a synopsis of the scene from whence the screen shot was obtained, but no information pertaining to other scenes. A fourth plot information set may include a synopsis of the entire video from start to finish. In any case, some or all of the information is returned to the AVD at block 510 for presentation as more fully described below. The description below also teaches that the plot information may include explanatory video clips that are part of the video being captured, as well as non-text symbols.

In some implementations, the user might identify the particular show or movie to the service. However, as discussed above the service can recognize the scene on its own and deliver information back to the AVD. Or as described above, the application that is streaming the content may also capture the screen images and therefore knows the content and where in the content it is playing from, so that the application may execute block 508 based on its knowledge of the location within the video of the captured screen shot(s).

This service can also link in to a forum of fans to see what they are thinking without revealing information about upcoming shows or scenes in a movie that might spoil the surprise in an ending.

Figure 5:
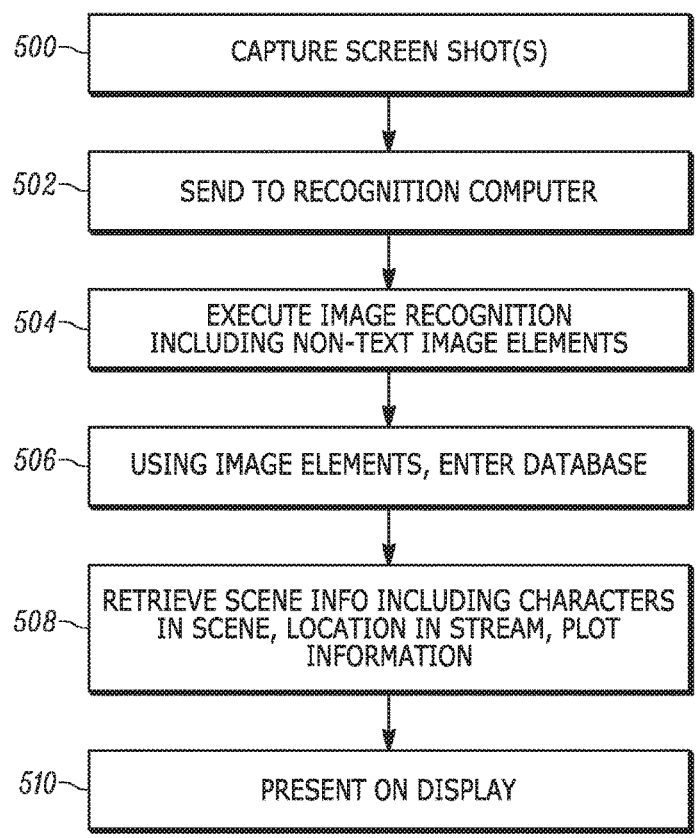
FIG. 5 is a flow chart of example logic that uses image recognition of onscreen images to retrieve plot information.
Figure 6:
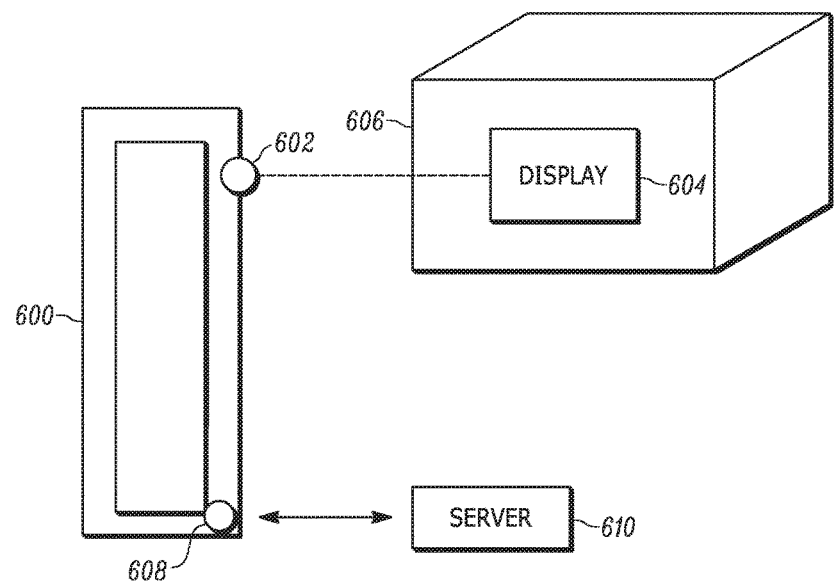
FIG. 6 is a schematic diagram of a system in which a mobile communication device (MCD) takes a picture of a screen of an audio video device (AVD) to retrieve plot information for display on the MCD.

Moving to FIG. 6, an alternate system is shown in which a mobile communication device (MCD) 600 such as a "smartphone" can, by means of a camera 602, take a picture of the scene being shown on the display 604 of an AVD 606 (such as the display 14 of the AVD 12 shown in FIG. 1). The MCD 600 can send, using a communication interface 608 such as any of the communication interfaces described herein, the picture to a recognition computer such as a network server 610, which executes the appropriate logic of FIG. 5 and sends the results back to the MCD 600 for presentation thereon. The results need not be sent to the AVD 12.

Figure 7:
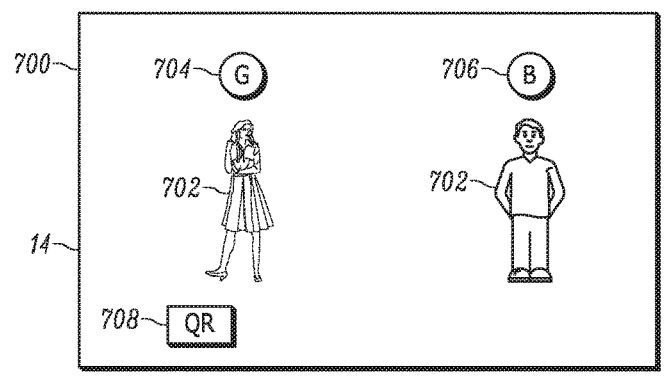
FIG. 7 is a screen shot of an example presentation of example symbolic plot information.

FIG. 7 illustrates an example screen shot 700 of the display 14 of the AVD 12 upon receiving plot information from the logic of FIG. 5. The purpose of FIG. 7 is to show that while plot information may be textual, it may additionally or alternatively be non-text symbols. In the example shown, for instance, two people 702 are in the scene. Based on image recognition, the plot information reveals that one of the people is a "good guy" and one is a "bad guy". Accordingly, the plot information returned and displayed on the AVD includes a "good guy" symbol 704 for one individual, which may be, by way of non-limiting example, a green symbol as indicated for disclosure purposes by the letter "G" (the letter "G" itself need not be actually presented). The plot information returned and displayed on the AVD may also include a "bad guy" symbol 706 for the other individual, which may be, by way of non-limiting example, a red symbol as indicated for disclosure purposes by the letter "B" (the letter "B" itself need not be actually presented). A quick response (QR) code 708 may also be presented for purposes described below.

Figure 8:
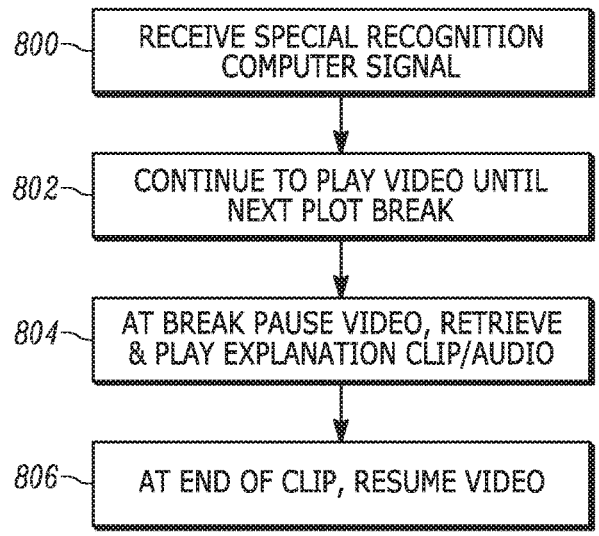
FIG. 8 is a flow chart of example logic for playing plot information in the form of an explanatory video clip at a break in the main video.

FIG. 8 shows example logic for playing plot information in the form of an explanatory video clip at a break in the main video. Commencing at block 800 a special command from, e.g., the RC 44 may be received. The command may be generated by manipulation of the "info" key. The video continues to play uninterrupted as indicated at block 802 until a next plot break. The next plot break may be at the end of the current scene prior to the start of the next scene. As indicated at block 804, upon reaching the break, the video automatically may be paused without necessarily receiving a "pause" command from the viewer, and the explanatory video (or audio or audio-video) clip that was downloaded at block 510 in FIG. 5 as part (or all) of the plot information is played on the AVD. At the end of the explanatory clip at block 806, play of the main video from whence the screen shot was taken may be automatically resumed without necessarily requiring a user "play" command.

Figure 9:
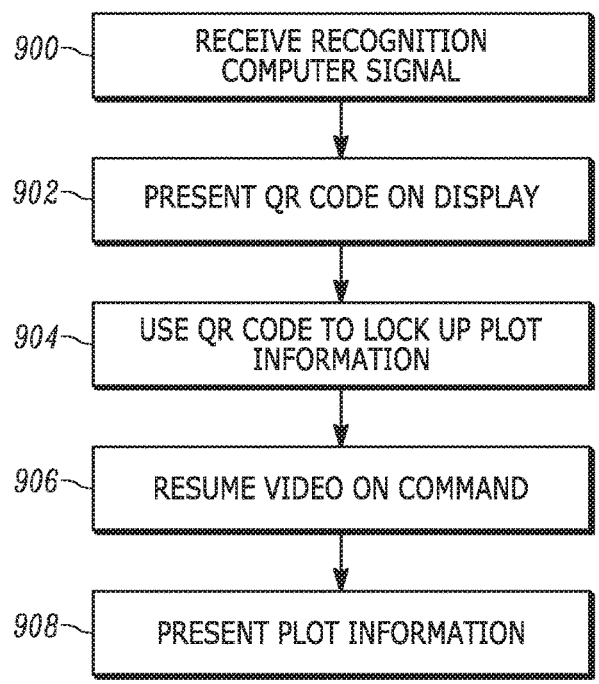
FIG. 9 is a flow chart of example logic for retrieving plot information using a quick response (QR) code that is presented in response to receiving a "pause" or other special remote control (RC) command.

FIG. 9 illustrates logic appertaining to the QR code 708 depicted in FIG. 7 and mentioned above. At block 900, a special command can be received from, e.g., the RC 44. The command may be a "pause" command received during play of the main video, which pauses the video. In response to this command, the QR code 708 may be presented at block 902. The QR code 708 contains information about the current scene that can be looked up to retrieve the plot information at block 508 in FIG. 5, it now being understood that the logic of FIG. 9 may require only image recognition of the QR code, as opposed to video images. Using the QR code, at block 904 the recognition computer (such as the above-described network server) looks up the corresponding plot information and returns it to the AVD for presentation. The video may be resumed as block 906 and the plot information displayed at block 908, it being understood that the plot information may be presented while the video is paused or overlaid onto the video while playing.

Figure 10:
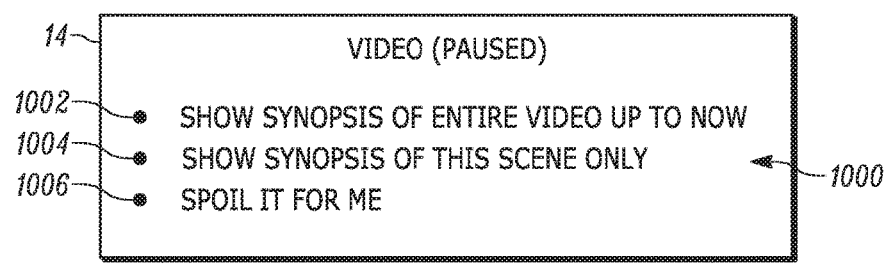
FIG. 10 is a screen shot of an example user interface (UI) to allow a viewer to determine what type of plot information should be presented.

FIG. 10 illustrates a means for allowing a viewer to select what kind of plot information he wishes to avail himself of, it being understood that the various sets of plot information described above in reference to FIG. 5 may be downloaded to the AVD with the viewer given the opportunity to select which specific type of information he wants. A user interface (UI) 1000 may be presented on the display 14 of the AVD 12 with a first selector 1002 selectable to cause presentation of plot information relating to the content from the start of the content to a current location of the content, but not beyond the current location. The UI 1000 may include a second selector 1004 selectable to cause presentation of plot information relating to the content from the start of the first scene, but not before, to a current location of the content, but not beyond the current location. The UI 1000 may also include a third selector 1006 selectable to cause presentation of plot information relating to the content in its entirety from beginning to end of the content, essentially a "spoiler" presentation for a perhaps bored viewer who wishes to stop watching the video but would like to know the ending.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD Rom or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. A computer program product comprising:
at least one computer readable storage medium that is not a transitory signal and that comprises instructions executable by a processor to configure the processor for:
for a first scene in plural scenes of a piece of content, capturing at least a portion of at leas one frame in the content;
providing at least a portion of the at least one frame to an image recognition device that recognizes video elements including non-textual elements in the frame;
receiving from the image recognition device first plot information relating to the first scene, the first plot information not relating to scenes occurring in the content after the first scene occurs; and
presenting the first plot information, wherein the first plot information is obtained at least in part by:
receiving a first command from a remote control (RC);
responsive to the first command, presenting at least one code on a display;
capturing the code;
providing the code to the image recognition device that recognizes video elements including non-textual elements in the frame; and
receiving from the image recognition device the first plot information.

2. The computer program product of claim 1, comprising the processor.

3. The computer program product of claim 1, comprising at least one display controllable by the processor to present the content.

4. The computer program product of claim 1, wherein the instructions are executable for:
capturing the at least one frame in response to one or more commands received form a remote control (RC).

5. The computer program product of claim 1, wherein the instructions are executable for:
playing the content using a first computer application; and
capturing the at least one frame using a second computer application different than the first computer application.

6. The computer program product of claim 1, wherein the instructions are executable for:
playing the content using a first computer application; and
capturing the at least one frame using the first computer application.

7. The computer program product of claim 1, wherein the first plot information comprises at least one non-textual symbol.

8. The computer program product of claim 1, wherein the instructions are executable for:
presenting the first plot information at a predetermined location in the content occurring after the at least one frame is captured, the content being paused at the predetermined location, the first plot information that is presented while the content is paused at the predetermined location comprising at least one video clip that is not part of the content.

9. The computer program product of claim 1, wherein the instructions are executable for:
presenting on a display at least one user interface (UI), the UI comprising at least:
a first selector selectable to cause presentation of plot information relating to the content from the start of the content to a current location of the content, but not beyond the current location; and
a second selector selectable to cause presentation of plot information relating to the content from the start of the first scene, but not before, to a current location of the content, but not beyond the current location.

10. The computer program product of claim 9, wherein the UI comprises:
a third selector selectable to cause presentation of plot information relating to the content in its entirety from beginning to end of the content.

11. An assembly comprising:
at least one non-transitory computer readable storage medium with instructions executable by a processor to configure the processor for:
displaying at least one image from content played on at least one audio video device (AVD);
the content comprising a start and a first scene;
presenting on a display at least one user interface (UI), the UI comprising at least:
a first selector selectable to cause presentation of plot information relating to the content from the start of the content to a current location of the content, but not beyond the current location; and
a second selector selectable to cause presentation of plot information relating to the content from the start of the first scene, but not before, to a current location of the content, but not beyond the current location;
receiving at least one selection of at least one of the selectors; and
responsive to the selection, presenting the plot information.

12. The assembly of claim 11, comprising the processor.

13. The assembly of claim 11, wherein non-textual portion used to identify the plot information comprises an image of a video object.

14. The assembly of claim 11, wherein non-textual portion used to identify the plot information comprises a computer code.

15. The assembly of claim 11, wherein the assembly comprises the AVD.

16. The assembly of claim 11, wherein the assembly comprises a mobile communication device (MCD) that is not the AVD.

17. The assembly of claim 11, wherein the plot information comprises a video clip.

18. A method, comprising:
at an audio video device (AVD), receiving a command to present plot information to be presented at a predetermined location in video being presented on the AVD;
responsive to the command, continuing to play the video until the predetermined location is reached;
responsive to reaching the predetermined location, automatically pausing the video; and
with the video paused, presenting the plot information on the AVD.

19. The method of claim 18, wherein the plot information comprises a video clip different from the content.

* * * * *